US007687648B2

(12) United States Patent
Smallridge et al.

(10) Patent No.: US 7,687,648 B2
(45) Date of Patent: Mar. 30, 2010

(54) BIOMASS EXTRACTS WITH PROTEIN AND NUTRITIONAL VALUE

(75) Inventors: Lon E. Smallridge, West Des Moines, IA (US); Floyd C. Teeter, Jr., Woodbury, MN (US)

(73) Assignee: Crown Iron Works Company, Roseville, MN (US)

(*) Notice: Subject to any disclaimer, the term of this patent is extended or adjusted under 35 U.S.C. 154(b) by 25 days.

(21) Appl. No.: 11/375,461

(22) Filed: Mar. 14, 2006

(65) Prior Publication Data

US 2006/0211874 A1 Sep. 21, 2006

Related U.S. Application Data

(60) Provisional application No. 60/661,675, filed on Mar. 14, 2005.

(51) Int. Cl.
*C11B 1/00* (2006.01)

(52) U.S. Cl. .......................................... 554/8; 426/635

(58) Field of Classification Search .................... 554/8; 426/635

See application file for complete search history.

(56) References Cited

U.S. PATENT DOCUMENTS 3,607,391 A 9/1971 Hull et al.
3,966,982 A 6/1976 Becker
4,211,695 A 7/1980 Oughton
4,357,865 A 11/1982 Knuth et al.
4,675,133 A * 6/1987 Eggers et al. .................. 554/8
4,683,063 A 7/1987 Rice
4,744,926 A 5/1988 Rice
4,770,780 A 9/1988 Moses
4,877,530 A 10/1989 Moses
4,901,635 A 2/1990 Williams
5,014,245 A 5/1991 Muroka et al.
5,035,910 A 7/1991 Jones
5,041,245 A 8/1991 Benado
5,169,968 A 12/1992 Rice
5,278,325 A 1/1994 Strop
5,290,959 A 3/1994 Rice
5,516,923 A 5/1996 Herbert
5,707,673 A 1/1998 Prevost
5,858,449 A * 1/1999 Crank et al. ................ 426/656
5,939,571 A 8/1999 Foidl
5,998,640 A 12/1999 Haefele
6,146,669 A 11/2000 Jones
6,201,145 B1 3/2001 Fan
6,688,217 B2 2/2004 Hauck et al.

(Continued)

FOREIGN PATENT DOCUMENTS

DE 2915538 A 10/1980

OTHER PUBLICATIONS

Wang et al., JAOCS, vol. 78, No. 3, pp. 311-318, 2001.*

(Continued)

*Primary Examiner*—Deborah D Carr
(74) *Attorney, Agent, or Firm*—Fredrikson & Byron, PA

(57) ABSTRACT

Biomass extracts with high protein and nutritional value and methods for making the same are disclosed. Such extracts may include cakes with low residual oil and high levels of desirable constituents and oils that require little to no downstream processing upon extraction from the biomass. Also includes methods of extracting desirable products from an oil bearing biomass.

12 Claims, 1 Drawing Sheet

10 100 40 110 20 30 50 150 60 60 70 140 170 120 130 160 80

U.S. PATENT DOCUMENTS

| | | | |
|---|---|---|---|
| 6,777,017 | B2 | 8/2004 | Porter |
| 6,793,951 | B2 | 9/2004 | Kapila |
| 6,800,318 | B2 | 10/2004 | Kapila |
| 7,045,164 | B2 | 5/2006 | Beaver et al. |
| 2004/0131747 | A1 | 7/2004 | Porter |
| 2004/0219281 | A1 | 11/2004 | Porter |
| 2006/0292284 | A1 | 12/2006 | Irwin et al. |

OTHER PUBLICATIONS

Crowe et al., Characterization of Extruded-Expelled Soybean Flours, Journal of American Oil Chemists' Society (2001), 78(8), pp. 775-779.

Clifford, A. A., Oil Processing Assisted by Carbon Dioxide, Source and date unknown.

English-language Abstract for DE 2915538, Knuth et al.

* cited by examiner

BIOMASS EXTRACTS WITH PROTEIN AND NUTRITIONAL VALUE

RELATED APPLICATIONS

This application claims priority to U.S. Provisional Application No. 60/661,675, entitled "High Pressure Liquid Extraction," filed Mar. 14, 2005, which is incorporated herein by reference.

TECHNICAL FIELD

The present invention relates to oils and cakes produced from a biomass (e.g., fruits, seeds, germ) using liquid extraction processes and methods of producing these products. More particularly, to edible defatted cakes and complementary oils produced using continuous solvent extraction methodologies and those methodologies.

BACKGROUND OF THE INVENTION

Screw presses for, and methods of expelling oil from oil bearing material/solids are well known in the art. Such oil bearing material may include oil bearing seeds or fruits. The products resulting from these expelling products may include an oil and a defatted cake. Defatted flakes and cakes may also be produced by continuous solvent extraction using hexane. These process may require subsequent desolventizing via toasting. In addition to continuous hexane extraction, limited batch extraction methods are known, utilizing a variety of solvents, for producing edible defatted flakes.

As an example of an oil bearing material, raw, dehulled soybeans generally comprise 18% oil, 15% soluble carbohydrates, 15% insoluble carbohydrates, 14% moisture and ash, and 38% protein. Edible defatted flakes and cakes, an intermediate of bean processing, are the basis of many soy protein products, for example, soy cake, soy flour, soy milk, soy concentrates, soy isolates, and soy aqua feeds. The same range of improved products can be made from flakes and cakes derived from extracted soy germ rather than beans. High quality oils and cakes improve the nutritional value and other characteristics of a wide range of important products.

BRIEF SUMMARY OF THE INVENTION

In one embodiment, the invention comprises a defatted biomass product having less than 6% residual oil and a PDI of greater than 60% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass.

In another embodiment, the invention comprises a defatted biomass product having less than 5% residual oil and a PDI of greater than 60% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass.

In another embodiment, the invention comprises a defatted biomass product having less than 5% residual oil and a PDI of greater than 70% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass. In an alternative embodiment of this defatted biomass product, the PDI may be greater than 80%.

In yet another embodiment, the invention comprises a defatted biomass product having less than 6% residual oil and a PDI of greater than 60% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass. In this embodiment, the pressure may be relieved on the second cake plug to make it permeable to fluids. Solvent may be injected into the extraction unit at a point where the pressure on the second cake plug has been relieved, creating a second mixture of solvent and biomass. The second mixture may then be compressed to form a third cake plug and to push solvent and oil from the biomass.

In another embodiment, the invention comprises a defatted biomass product having less than 6% residual oil and a PDI of greater than 60% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass. In the process of this embodiment, the solvent partially vaporizes within the mixture.

In yet another embodiment, the invention comprises a defatted biomass product having less than 6% residual oil and a PDI of greater than 60% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass. The solvent used in this embodiment is organic. In one alternative embodiment, the solvent is carbon dioxide.

In another embodiment, the invention comprises a defatted biomass product having less than 6% residual oil and a PDI of greater than 60% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass. In this embodiment, the oil removed from the raw biomass has an average phospholipid content of less than 25 ppm.

In another embodiment, the invention comprises a defatted biomass product having less than 5% residual oil and a PDI of greater than 70% that is produced by a process that includes feeding a raw biomass product to a compression zone of a screw press extraction unit and compressing the raw biomass in the screw press to form a cake plug that is essentially impermeable to fluids. The process also includes the steps of relieving the pressure on the cake plug to make it permeable to fluids and injecting solvent into the extraction unit at a point where the pressure on the cake plug has been relieved, creating a mixture of solvent and biomass. The mixture may then be compressed to form a second cake plug and to push solvent and oil from the biomass. In this embodiment the oil removed from the raw biomass has an average phospholipid content of less than 50 ppm. In yet another alternative embodiment, the oil removed from the raw biomass has an average phospholipid content of less than 25 ppm.

In another embodiment the invention comprises an unrefined organic oil extracted from soybeans. The oil of this embodiment has an average of less than 100 ppm phospholipids. Further, the defatted soybean cake from which the oil was extracted has a residual oil content of less than 5%. In an alternative embodiment, a similar oil has an average of less than 50 ppm phospholipids. In yet another embodiment, a similar oil has an average of less than 25 ppm phospholipids.

In another embodiment the invention comprises an unrefined organic oil extracted from soybeans. The oil of this embodiment has an average of less than 25 ppm phospholipids. Further, the defatted soybean cake from which the oil was extracted has a residual oil content of less than 4%.

Another embodiment of the invention comprises a method of producing a defatted cake and an oil. The method of this embodiment includes the steps of feeding an oil bearing biomass to a continuous screw press extractor, feeding an organic solvent to the extractor, and extracting oil from the biomass to create a defatted biomass having a residual oil content of less than 6%. Extracted oil having an average of less than 50 parts per million phosphorous is then separated from the defatted biomass.

Another embodiment of the invention comprises a method of producing a defatted cake and an oil. The method of this embodiment includes the steps of feeding an oil bearing biomass to a continuous screw press extractor, feeding an organic solvent to the extractor, and extracting oil from the biomass to create a defatted biomass having a residual oil content of less than 6%. Extracted oil having an average of less than 50 parts per million phosphorous is then separated from the defatted biomass. In this embodiment the temperature within the extractor is maintained below 260° F. In yet another embodiment of a similar method, the temperature within the extractor is maintained below 220° F.

Another embodiment of the invention comprises a method of producing a defatted cake and an oil. The method of this embodiment includes the steps of feeding an oil bearing biomass to a continuous screw press extractor, feeding an organic solvent to the extractor, and extracting oil from the biomass to create a defatted biomass having a residual oil content of less than 6%. Extracted oil having an average of less than 35 parts per million phosphorous is then separated from the defatted biomass. In another embodiment of a similar method, the extracted oil has less than 20 parts per million phosphorous.

DETAILED DESCRIPTION OF EMBODIMENTS OF THE INVENTION

Figure 1:
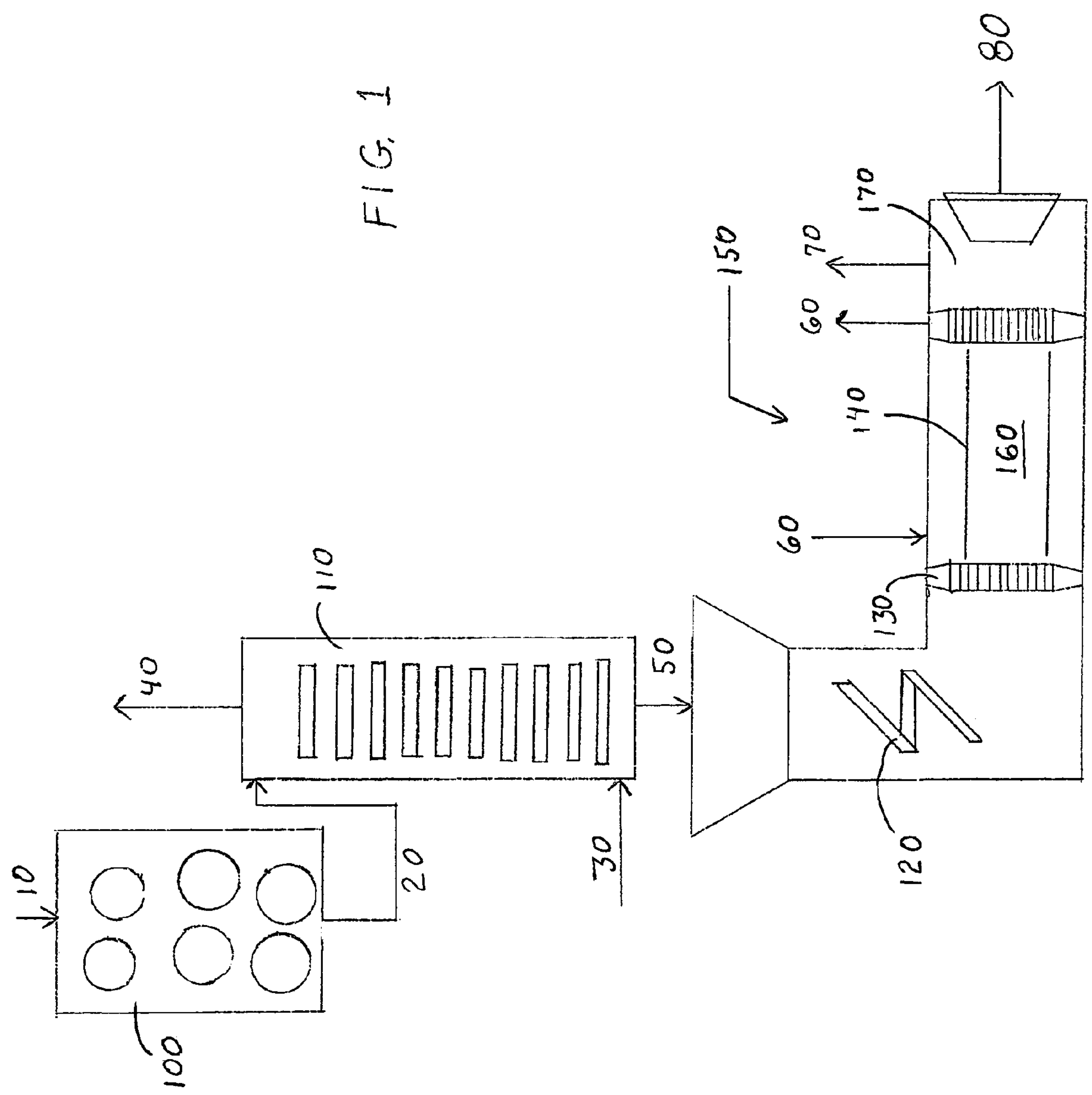
FIG. 1 is a unit operation schematic of a process in accordance with embodiments of the invention

A continuous high pressure liquid/gas extraction process is contemplated, more particularly, a process utilizing a screw press for directly processing oil bearing solids (e.g., oliferous seeds/germ/vegetation for oil extraction/expression and edible defatted flake/cake production), and/or intermediates thereof (e.g., edible defatted flakes in furtherance of producing, for example, cake, flour, milk, concentrates, isolates, and aqua feeds. This same range of products, and others, can be made from flakes and cakes derived from extracted germ rather than beans.). Suitable biomass feeds include, but are not limited to, soy beans, soy germ, wheat, wheat germ, corn, corn germ, and other oilferous vegetation.

With regard to processing whole or cracked beans or germ, processes useful in accordance with the present invention have many advantages. When processing biomass comprising soybeans, whole or cracked beans having a moisture content greater than 10% may be directly processed. This may eliminate the need for much of the preparation equipment required with traditional solvent extraction or screw press plants.

Extraction may occur at relatively low temperatures, and for relatively short time periods, thereby reducing heat input to the oil and the cake. In the case of the cake, this reduced processing severity may lessen the degradation of valuable protein components. Cakes produced by processes in accordance with the invention result in higher yield isolates and other downstream products. These cakes can be used to produce higher value end products (i.e., infant formula) and sold into premium markets.

Processes in accoradance with embodiments of the invention may use solvents to facilitate extraction and separation processes. Processes in accordance with the invention may use "organic" solvents such as carbon dioxide and alcohols. In the extraction industry, and for the purposes of this application, "organic" solvents are defined as non-toxic alcohols and gases, as opposed to hydrocarbons such as hexane that are frequently used in solvent extraction of oils from biomass. The use of organic solvents result in a cake that can be marketed as "organic," and in some cases as "solvent-free." Organic solvents, as defined herein, can also be called "clean" solvents because they leave no unacceptable residue in the edible oil or cake as compared to solvents such as hexane that may leave undesirable residue.

Defatted cakes produced in accordance with embodiments of the invention have a residual oil content of less than 6%, and in various embodiments in the range of about 2-4%. Known full press plants that do not use solvents typically leave 6-8% residual oil in the meal or cake. As used herein, the term "defatted" means that a substantial portion of the oils, lipids, and or fats present in a raw biomass have been removed through processing. Residual oil values provided throughout this specification are measured by ether extraction using AOCS Official method Ac 3-44.

Embodiments of the invention include oils and cakes continuously produced from biomass. These oils and cakes have superior properties as a result of the equipment used to separate the oils from the cakes and the extraction process parameters employed in the separation. The oils and cakes have a wide variety of downstream applications including, but not limited to, the production of flours, milks, concentrates, isolates, aqua feeds, and oils.

An exemplary process used to continuously produce cakes and oils in accordance with the invention includes physical removal of low protein components of the biomass, feeding of the remaining biomass to a continuous liquid extractor, contacting the remaining biomass with an organic solvent in the continuous liquid extractor, separating the extracted oil, the cake, and solvent from each other. Examples of processes capable of producing products in accordance with the invention are described in greater detail below. Many of these descriptions relate to soybean processing, however, the processes described and the related examples are merely exemplary and the scope of the invention is limited only by the language of the claims appended hereto.

Turning now to the FIGURE, FIG. 1 is a unit operation schematic of a process in accordance with embodiments of the invention. Preferably, but not necessarily, the subject process includes preparation of the oil bearing material to, among other things, reduce the fiber content thereof, and high pressure liquid extraction to fractionate a lipid and/or extract fraction from the prepared feedstock. Processes in accordance with the invention may extract other compounds including, but not limited to, caffeine from coffee and aflatoxin from aspergillus restrictus-containing biomass. The process, as applied to a raw and/or defibered biomass, yields a meal or cake of superior character and quality.

Many of the process flow streams have been assigned numbers to clarify the discussion of this process. In the embodiment FIG. 1, whole soybeans 10 are fed into rollers 100 in order to open the seed coat and allow the cotyledon (seed leaf) and hypocotls (germ) to separate from the hull. Optionally, whole beans (i.e., non-pretreated oil bearing material) may be fed directly to the screw press feeder 130. However, for the sake of making higher total protein flake/cake, the hulls are advantageously removed to reduce total fiber.

The following are exemplary representative total and nutrient mass balances for whole beans that may be fed to this process.

| | | | |
|---|---|---|---|
| Mass balance: | Whole Beans = | 100% | |
| | Hull = | 7.3% | |
| | Hypocotyls = | 2.4% | |
| | Cotyledon = | 90.3% | |
| Nutrient Mass Balance: | Protein = | 40.2% | (PDI = 85-92%) |
| | Lipids = | 21% | |
| | Carbohydrates = | 33.9% | |
| | Ash = | 4.9% | |
| | | 100.0 | |

The seeds can be reduced by the rollers 100 or other means to halves, quarters, eighths, or smaller sizes. In the examples provided herein, halves and quarters were obtained and further processed.

In the next step of this exemplary process, hulls are separated from the cotyledon stream in a dehuller 110. Various well known and developing methods may be utilized, e.g., gravity tables, aspiration, etc. Hot de-hulling processes are known in the art and may be desirable for optimal hull removal. The method used in testing was the Crown Air Aspirator from Crown Iron Works Co. of Roseville, Minn., USA. In this process, the hull laden "cracks," 20 or beans that have been reduced through the rollers, are fed downward through a series of tube bundles where the cotyledons are knocked loose from the hulls. As the "cracks" travel downward, an opposing flow of air 30 carries the dislodged hulls upward. These hulls 40 are collected and further processed or sold. The aspirated cracks are, on a mass basis, higher in total protein. The following are exemplary representative total and nutrient mass balances for cracked and dehulled soybeans in accordance with this process.

| | | | |
|---|---|---|---|
| Mass balancer: | Whole Crack = | 100% | |
| | Cotyledon = | 94.3% | |
| | Hull = | 3.2% | |
| | Hypocotyls = | 2.5% | |
| Nutrients Mass Balance: | Protein = | 41.7% | (PDI = 85-92%) |
| | Lipids = | 21.8% | |
| | Carbohydrates = | 31.6% | |
| | Ash = | 4.9% | |
| | | 100.0 | |

The dehulled beans or cracks 50, in this example, may then be fed into a high pressure liquid/gas extractor 150. The cracks 50 can be feed into the screw press by means of mechanical shaft 120 that feeds the main sealing shaft 140 in a continuous sealed zone 160. The cracks 50 are then compressed into a relatively solid mass of material that is referred as press cake. The press cake is an essentially non-compressible gas-tight plug. As new cracks 50 are fed into the continuous sealed zone 160, they are added to the press cake. As this dense material travels down the main sealing shaft 140, it passes over compression zones that may be thought of as theoretical pistons. These "pistons" continuously create a plurality of sealed zones through the use of restrictor seals 130. The internals of the extractor may comprise a shaft of generally increasing diameter within a cylinder of consistent or variable diameter so that the available volume between the shaft and the cylinder wall generally decreases as the material passes through the press. The cylinder may be slotted or perforated to allow mechanical separation of liquids from solids. Interrupted helical flights are oriented around the shaft to convey the material through the press. The shaft may have larger diameter sections interspersed with smaller diameter sections to provide several high compression zones or theoretical pistons so that the material may be compressed, relieved, and compressed again. Screw presses of this type are well known in the art Liquid solvent 60 is injected into the sealed zones at a relatively high pressure. This pressure can be maintained by the restrictor seals 130 without allowing the solvent to migrate to the feed end or discharge end of the press. The liquid solvent 60 may be injected into the sealed zones at a pressure of about 1,000-12,500 pounds per square inch (psi) without significantly compromising the sealed nature of the zones.

In one embodiment, the solvent 60 may be injected into the press 150 by means of press injectors. The press injectors may comprise an injector ring having a plurality of spaced apart injectors. The injectors may be designed to prevent backflow of material or plugging. Injectors of a spring-loaded variety may be used as well.

The solvent may act to separate the cake from the oil through a number of interactions, for example, dilution, concentration-driven diffusion, and/or displacement of lipids (i.e., oil) and other extractable materials from the oil bearing material. In the course of these interactions, the solvent forms a mixture with the oil called "miscella." The miscella travels along the main sealing shaft 140 and out of continuous sealed zone 160 or stage of the press by means of a relief zone 170 or stage outside of the sealed zone. Thereafter, solvent 60 exits the extractor 150, and the oil 70 exits to an oil receiving area for subsequent/further processing (i.e., refinement). A higher oil quality may be recovered due to low extraction temperatures (i.e., within the range of about negative 20° F. to 200° F.).

A cake 80 is expelled from the press 150 essentially free of solvent. The extraction temperature in the subject process may be low enough to perform the desired separation without substantially degrading the proteins present or lowering the protein quality of the flake/cake. The cake may be conveyed directly to milling and/or to storage. The following are exemplary representative total and nutrient mass balances for a cake produced by this process.

| | | | |
|---|---|---|---|
| Mass balance: | Cake = | 100% | |
| | Cotyledon = | 93.3% | |
| | Hull = | 3.9% | |
| | Hypocotyls = | 2.8% | |
| Nutrients Mass Balance in the cake: | Protein = | 51.7% | (PDI~75-82%) |
| | Lipids = | 3.0% | |
| | Carbohydrates = | 39.2% | |
| | Ash = | 6.1% | |
| | | 100.0 | |

Phospholipids are an important dietary component. As the name implies, phospholipids are made of the combination of lipids and the mineral phosphorus. Phosphorous content of food products can be used as a proxy for Phospholipid content. That is, it is common to measure phosphorous content in a biomass when trying to determine the phospholipid content. Phospholipid content is then expressed as, for example, parts per million phosphorous. Although present in many foods, phospholipids are found in relatively high concentrations in soybeans.

Phospholipids are found in high concentrations in the lining of practically every cell of the body, including brain cells. They help brain cells communicate and influence how well receptors function, and are therefore important for brain health, among other reasons. A balanced dietary intake of phospholipids may increase learning and memory, especially among seniors. There is some evidence that phospholipids may help reduce the effects of age related cognitive decline (ACRD), Alzheimer's disease, and Parkinson's disease, though no firm conclusions are available at this time.

Cakes and meals produced in accordance with the invention have relatively high phospholipid content. The inventors have learned that the processes employed preferentially leave the phospholipids in the cake rather than extracting them in the oil. It was surprising to those of ordinary skill in the art that processes in accordance with the invention can improve phospholipid retention in the defatted cake. This results in cake, and an oil, of unique and superior quality. Processes in accordance with this invention that process dehulled soybeans to a residual oil level of 4% may yield an oil having about 20 ppm phosphorous. By way of exemplary comparison, the same feed processed to the same extent by a known full press plant without a solvent yields oil having about 850 ppm phosphorous and a non-organic hexane extraction unit yields oil having more than 200 ppm of phosphorous.

While phospholipids have certain advantages when found in cakes produced in accordance with the invention, extracted oils with high phospholipid content may be undesirable. Oils with high phospholipid content often require extensive downstream refining such as degumming (i.e., acid degumming) to remove phospholipids. Phospholipids may oxidize elements of the oil, resulting in a reduced shelf-life and/or causing oils to fail to meet color or clarity specifications.

Protein Dispersibilty Index (PDI) is a measure of the percent of total protein that disperses in water under standard conditions. PDI values provided herein are measured using AOCS Official Method Ba 10-65. PDI values are useful measurements of the nutritional value of protein-laden cakes and defatted cakes because PDI values are related to the digestibility of the proteins. The PDI value of a defatted cake is a function of the processing conditions that the cake was subjected to during the process of extracting the oils. If the cake is subjected to high temperatures for long periods of time, the proteins may degrade and the PDI value will be lower. Cakes with higher PDI values are more valuable in many downstream processes and applications. When operated to achieve similar residual oil levels in soy cake (i.e., 2-4%), processes in accordance with the current invention may reduce the PDI about 5-20 points as opposed to a drop of 50 or more points in traditional press plants.

EXAMPLE 1

Dehulled soybeans were metered with an auger into a screw press at a rate of approximately 10.4 Tons per day (TPD). The dehulled beans had a base PDI of 86.1% and a residual oil content of 19.8%. The screw press had three injector rings each containing six injectors. The injector rings each aligned with a relatively lower pressure "relieving" area of the press. A carbon dioxide solvent was injected at a rate of 12.9 TPD (2.1 gallons per minute) distributed among the 18 injectors. This equates to a 1.2:1 ratio of carbon dioxide to dehulled soybean feed.

The resulting cake was sampled and had a PDI of 62.4% and a residual oil content of 3.6%. Throughout the test run the residence time of the cake within the press was approximately three minutes. The discharge cake temperature was between 110° F. and 130° F. at the outside of the cake and 180° F. to 210° F. on the inside of the cake.

The low protein degradation coupled with high oil removal in this example is made possible by the combination of low residence time in the press (less than three minutes), low temperature within the press, and the effective removal of oil by the carbon dioxide solvent. The carbon dioxide solvent of this example is injected into the press as a liquid at pressures of between 3000 and 5000 psi. The carbon dioxide flows generally countercurrently through the press and partially vaporizes in the compressed cake. It is believed that this vaporization aids in the mechanical separation of oil from cake and, through evaporative cooling, to the ability to maintain of low temperature within the cake.

EXAMPLE 2

Dehulled soybeans were metered with an auger into the same screw press used in Example 1 at a rate of approximately 7.4 Tons per day (TPD). The dehulled beans had a base PDI of 86.1% and a residual oil content of 19.8%. A carbon dioxide solvent was injected at a rate of 9.2 TPD (1.5 gpm) distributed among the 18 injectors. This injection rate equates to a ration of 1.5:1 of carbon dioxide to dehulled soybeans The resulting cake was sampled and had a PDI of 75.6% and a residual oil content of 3.9%. The low protein degradation coupled with high oil removal in this example is made possible by the combination of low residence time in the press (less than three minutes), low temperature within the press, and the effective removal of oil by the carbon dioxide solvent. The carbon dioxide solvent of this example is injected into the press as a liquid at pressures of between 3000 and 5000 psi. The carbon dioxide flows generally countercurrently through the press and partially vaporizes in the compressed cake. It is believed that this vaporization aids in the mechanical separation of oil from cake and, through evaporative cooling, to the ability to maintain of low temperature within the cake.

EXAMPLE 3

The dehulled soybeans of Example 1 were processed as described in Example 1. A cake and oil product were produced. Laboratory testing of the oil produced the following results.

| Soybean Oil | |
|---|---|
| Lovibond Yellow Color | 70 |
| Lovibond Red Color | 10.1 |
| Free Fatty Acids (% Oleic) | 0.17 |
| Peroxide Value | 0.37 |
| IV by Refractive Index | 123.9 |
| Chemical Iodine Value | 127.4 |
| Moisture and Volatiles | 0.02 |
| Impurities | 0.07 |
| Neutral Oil Loss | 1.2 |
| Chlorophyl Anisidine (ppb) | 691 |
| Cold test @ 32° F. (hours) | 24 |
| OSI @ 97.5 (hours) | 23.18 |
| Sodium (ppm) | 1 |
| Magnesium (ppm) | 6 |
| Silica (ppm) | 0.58 |
| Phosphorous (ppm) | 19.4 |
| Calcium (ppm) | 6.5 |
| Iron (ppm) | 1 |
| Nickel (ppm) | None Detected |
| Copper (ppm) | None Detected |
| Tocopherols (ppm) | |
| alpha | 90 |
| beta | 12 |
| gamma | 922 |
| delta | 261 |
| total | 1285 |
| Gums | 0.09% |

As discussed above, soybeans are rich in phospholipids. It was unheard of prior to inventors' discovery of the processes of this invention for oil from an extraction unit to have fewer than 200 ppm phospholipids with high oil recovery (3-6% residual oil in the cake). This was unachievable by previous mechanical extraction systems, a solvent extraction systems, or combined solvent/mechanical extraction technologies. Processes in accordance with the invention can extract high levels of oils from cakes without extracting high levels of phopholipids, reducing downstream processing of these oils. These processes also result in soy cakes having higher phospholipid content and better associated nutritional and health benefits. This example shows an oil having a phospholipid content of 19.4 ppm, a level that was previously unachievable without refining of the oil coming off of the extraction unit.

While preferred embodiments of the present invention have been described, it should be understood that various changes, adaptations and modifications may be made therein without departing from the spirit of the invention and the scope of the appended claims.

What is claimed is:

1. A method of producing an organic defatted cake and an oil, the method comprising:

a. dehulling a whole bean or whole grain feedstock to provide an oil bearing biomass from which the hulls have been removed:

b. feeding the oil bearing biomass to a continuous screw press extractor;

c. compressing the biomass in the screw press extractor to form a cake plug that is essentially impermeable to fluids;

d. relieving the pressure on the biomass in the screw press extractor;

e. feeding an organic solvent to the screw press extractor and into the biomass;

f. compressing the biomass in the screw press extractor to extract oil and solvent from the biomass to create the organic defatted cake having a residual oil content of less than 6%;

g. separating the extracted oil and solvent from the defatted biomass; and h. recovering the extracted oil, the oil having an average of less than 50 parts per million phosphorous.

2. The method of claim 1, wherein the temperature within the extractor is maintained below 260° F.

3. The method of claim 1, wherein the temperature within the extractor is maintained below 220° F.

4. The method of claim 1, wherein the extracted oil has less than 35 parts per million phosphorous.

5. The method of claim 1, wherein the extracted oil has less than 20 parts per million phosphorous.

6. An organic defatted biomass product having less than 6% residual oil and a PDI of greater than 60%, the defatted biomass product being produced by a process comprising:

a. feeding a raw biomass comprised of dehulled whole beans or dehulled whole grain or of germ to a compression zone of a screw press extraction unit;

b. compressing the raw biomass in the extraction unit to form a cake plug that is essentially impermeable to fluids;

c. relieving the pressure on the cake plug in the screw press extraction unit to make it permeable to fluids;

d. injecting an organic solvent selected from the group consisting of non-toxic alcohols and gases into the extraction unit to form a mixture of solvent, oil and biomass; and e. compressing the mixture in the extraction unit to form a second cake plug and to push solvent and oil from the biomass, the second cake plug from which solvent and oil has been pushed being the organic defatted biomass product having a residual oil content of less than 6% and a PDI of greater than 60%; and wherein the organic defatted biomass product is hexane free.

7. The method of claim 1, wherein the feedstock is soybean.

8. The method of claim 1, further comprising the step of further processing the dehulled feedstock to provide a germ fraction as the oil bearing biomass.

9. A method of producing an organic defatted cake and an oil, the method comprising:

a. providing a continuous screw press extractor for compression of a biomass and extraction of oil and solvent from the biomass;

b. feeding a dehulled oil bearing biomass to the continuous screw press extractor;

c. compressing the biomass in the screw press extractor to form a cake plug that is essentially impermeable to fluids;

d. relieving the pressure on the biomass in the screw press extractor;

e. feeding an organic solvent to the screw press extractor and into the biomass;

f. compressing the biomass in the screw press extractor to extract oil and solvent from the biomass to create the organic defatted cake wherein the organic defatted cake has a residual oil content of less than 6%, a PDI of greater than 60%;

g. separating the extracted oil and solvent from the defatted biomass; and h. recovering the extracted oil, the oil having an average of less than 100 parts per million phosphorous.

10. A method of producing an organic defatted cake and oil, the method comprising:

a. feeding a raw dehulled biomass to a compression zone of a screw press extraction unit;

b. compressing the raw dehulled biomass in the screw press extraction unit to form a cake plug that is essentially impermeable to fluids;

c. relieving the pressure on the cake plug in the screw press extraction unit to make the cake plug permeable to fluids;

d. injecting organic solvent into the screw press extraction unit at a point where the pressure on the cake plug has been relieved to create a mixture of solvent and biomass;

e. compressing the mixture in the screw press extraction unit to extract the solvent and the oil from the biomass to form the organic defatted cake, the organic defatted cake having a residual oil content of less than 6% and a PDI of greater than 60%;

f. separating the extracted oil and solvent from the defatted cake; and g. recovering the extracted oil, the oil having an average of less than 100 parts per million phosphorous.

11. The method of any one of claims 1, 9 and 10 wherein the organic solvent is a gas or a non-toxic alcohol.

12. The method of any one of claims 1, 9 and 10 wherein the organic solvent is carbon dioxide.

* * * * *